(12) United States Patent
Ishii

(10) Patent No.: US 8,082,309 B2
(45) Date of Patent: Dec. 20, 2011

(54) DELIVERY SYSTEM AND COMPUTER PROGRAM PRODUCT

(75) Inventor: Yuuichi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 236 days.

(21) Appl. No.: 11/968,984

(22) Filed: Jan. 3, 2008

(65) Prior Publication Data

US 2008/0172444 A1    Jul. 17, 2008

(30) Foreign Application Priority Data

Jan. 17, 2007  (JP) ................................ 2007-008539

(51) Int. Cl.
    *G06F 15/16*    (2006.01)
(52) U.S. Cl. ....... 709/206; 709/203; 705/7.27; 705/301; 705/348
(58) Field of Classification Search ................... 709/206
    See application file for complete search history.

(56) References Cited

U.S. PATENT DOCUMENTS

| | | | | |
|---|---|---|---|---|
| 6,725,221 | B2* | 4/2004 | Murakami et al. ............ | 709/201 |
| 6,956,662 | B1* | 10/2005 | Kamimura .................... | 358/1.15 |
| 7,052,190 | B2 | 5/2006 | Ishii et al. | |
| 2002/0138476 | A1* | 9/2002 | Suwa et al. ........................ | 707/3 |
| 2003/0097399 | A1* | 5/2003 | Yuan et al. .................... | 709/203 |
| 2003/0233372 | A1* | 12/2003 | Warner et al. .............. | 707/104.1 |
| 2004/0002841 | A1* | 1/2004 | Mayuzumi et al. ................ | 703/7 |
| 2004/0019512 | A1* | 1/2004 | Nonaka .............................. | 705/8 |
| 2004/0264811 | A1* | 12/2004 | Yano et al. ..................... | 382/306 |
| 2005/0015293 | A1* | 1/2005 | Henn et al. ......................... | 705/9 |
| 2005/0188041 | A1* | 8/2005 | Kuriki et al. ................... | 709/206 |
| 2006/0085245 | A1* | 4/2006 | Takatsuka et al. ................. | 705/9 |
| 2006/0165459 | A1 | 7/2006 | Ishii | |
| 2007/0061377 | A1* | 3/2007 | Tani .............................. | 707/200 |
| 2007/0094248 | A1* | 4/2007 | McVeigh et al. .................. | 707/4 |
| 2007/0162549 | A1* | 7/2007 | Jin et al. ........................ | 709/206 |
| 2008/0127183 | A1* | 5/2008 | Emerson et al. .............. | 718/100 |

FOREIGN PATENT DOCUMENTS

| | | |
|---|---|---|
| JP | 2001-282970 | 10/2001 |
| JP | 2004-628859 | 2/2004 |
| JP | 2004-274150 | 9/2004 |
| JP | 2004-288041 | 10/2004 |
| JP | 2005-175594 | 6/2005 |

\* cited by examiner

*Primary Examiner* — Greg C Bengzon
*Assistant Examiner* — Ninos Donabed
(74) *Attorney, Agent, or Firm* — Dickstein Shapiro LLP

(57) ABSTRACT

When delivery data input to a delivery server is directly input to an MFP by an applicant, an examination request flow is determined as a flow to be executed next. When the delivery data input to the delivery server is transmitted from an information processing apparatus of an examiner, an approval request flow is determined as the flow to be executed next. When the delivery data input to the delivery server is transmitted from the information processing apparatus of an approver, an issuance flow is determined as the flow to be executed next.

15 Claims, 10 Drawing Sheets

```
FROM: "APPLICANT" <user@xxx.co.jp>
TO: "EXAMINER" <shinsa@xxx.co.jp>
REPLY TO: "DELIVERY SERVER EMAIL INPUT" <email_input@xxx.co.jp>
SUBJECT: EXAMINATION REQUEST <FlowId="0001">
DATE: WEB, 19 MAR 2003 09:10:33 +0900
MIME-VERSION: 1.0
CONTENT-TYPE: text/plain; charset="iso-2022-jp"
```

340

| 342 | 344 |
|---|---|
| FROM ADDRESS | FlowID |
| shinsa@xxx.co.jp | 0002 |
| shounin@xxx.co.jp | 0003 |

FIG. 10
FIG. 11
EXAMINATION REQUEST FOR XXX OPERATION
PLEASE EXECUTE EXAMINATION PROCESS AFTER
LOGGING IN FROM THE URL BELOW
https://xxx.xxx.xxx/
FIG. 12
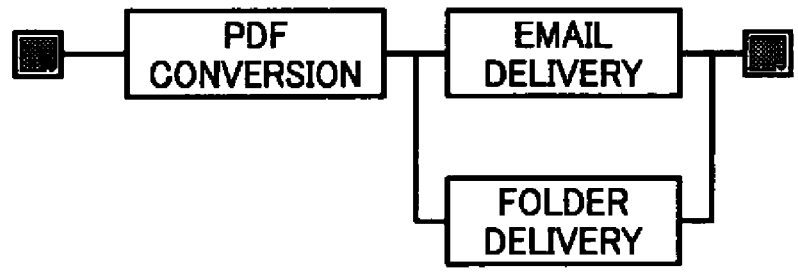

DELIVERY SYSTEM AND COMPUTER PROGRAM PRODUCT

CROSS-REFERENCE TO RELATED APPLICATIONS

The present application claims priority to and incorporates by reference the entire contents of Japanese priority document 2007-0008539 filed in Japan on Jan. 17, 2007.

BACKGROUND OF THE INVENTION

1. Field of the Invention

The present invention relates to a technology for delivering electronic data to a delivery destination.

2. Description of the Related Art

A delivery system that delivers electronic data stored in a document database or the like to an electronic mail (email) address specified by a user or to a folder on a file system has been conventionally used (see, for example, Japanese Patent Application Laid-open No. 2004-62859, Japanese Patent Application Laid-open No. 2004-274150, Japanese Patent Application Laid-open No. 2004-288041, and Japanese Patent Application Laid-open No. 2005-175594).

Further, a workflow system that defines a series of workflows relating to a certain operation or a series of flows standardized according to a work content to execute an operation based on the defined workflow has been heretofore used (Japanese Patent Application Laid-open No. 2001-282970). For example, in a case that a document is circulated to many persons in a company, when a workflow is used, the time required for each person to come to a place where the document is placed can be saved, thereby enabling speed-up of operations.

There has been a technique for circulating an electronic mail or an electronic document by applying the workflow to a delivery system that delivers electronic data to a delivery destination. According to this technique, as shown in FIG. 12, one flow can be built for one delivery destination. Therefore, portable document format (PDF)-converted data can be delivered by email delivery or folder delivery. In other words, because a plurality of delivery processes can be concurrently executed by one delivery operation, efficient processing is possible, and a user needs only to perform one delivery operation.

However, according to the conventional technique, after email delivery or folder delivery has been executed by one workflow, the flow cannot be repeated again. Therefore, in the company, when an operation is performed by transferring the electronic mail or the electronic document between persons in charge (applicant, examiner, and approver), there is a problem that such a workflow cannot be realized that examination by the examiner and approval by the approver are organized.

SUMMARY OF THE INVENTION

It is an object of the present invention to at least partially solve the problems in the conventional technology.

According to an aspect of the present invention, there is provided a delivery system including a delivery server that executes a workflow by receiving electronic data from an image forming apparatus and delivering the electronic data to a delivery destination. The workflow defines a plurality of delivery flows.

Furthermore, according to another aspect of the present invention, there is provided a computer program product including a computer-usable medium having computer-readable program codes embodied in the medium that when executed cause a computer to execute a delivery program for executing a function of a delivery server in a delivery system delivery system. The delivery server executes a workflow by receiving electronic data from an image forming apparatus and delivering the electronic data to a delivery destination. The workflow defines a plurality of delivery flows.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a schematic diagram of an example of an examination request flow;

FIG. 11 is a schematic diagram of an example of an email delivered from an MFP to an examiner by executing the examination request flow; and FIG. 12 is a schematic diagram of an example of a workflow in a conventional delivery system.

DETAILED DESCRIPTION OF THE PREFERRED EMBODIMENTS

Exemplary embodiments of the present invention are explained in detail below with reference to the accompanying drawings. Note that the invention is not limited to the embodiments. Furthermore, constituent elements in the embodiments include elements that persons skilled in the art can easily assume or that are substantially the same.

Figure 1:
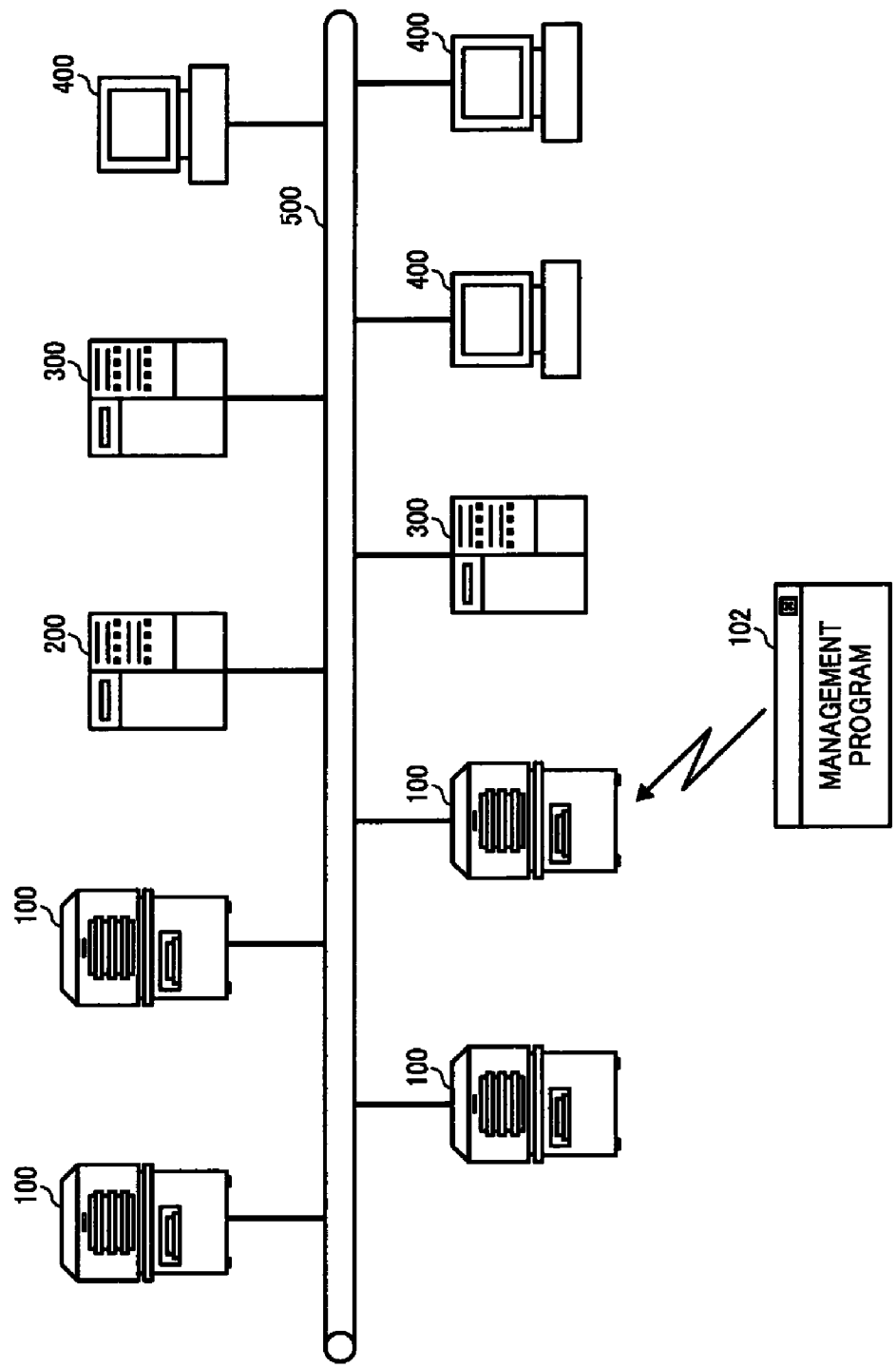
FIG. 1 is a schematic diagram of an example of a configuration of a delivery system.

FIG. 1 is a schematic diagram of an example of a configuration of a delivery system 1 according to a first embodiment of the present invention. The delivery system 1 according to the first embodiment includes a multifunction product (MFP) 100, a scanner application server 200, a delivery server 300, and an information processor 400 and is communicably connected to each other via a network 500. While the delivery system 1 shown in FIG. 1 includes four MFPs 100, one scanner application server 200, and two delivery servers 300, the number of respective devices is not limited to the one shown in FIG. 1.

A basic configuration of respective devices constituting the first embodiment is explained first.

The MFP 100 is an image forming apparatus in which a copy function, a fax function, a printer function, a scanner function, and a function for delivering the electronic data (image data read by the scanner function or image data input by the printer function or the fax function) are combined.

The MFP 100 includes a storage unit 140 (see FIG. 2) for registering location information (URL or IP address) of the scanner application server 200 and the delivery server 300. The location information is registered by a management program 102 installed beforehand in the MFP 100.

The user can activate a scanner application 210 (see FIG. 2) installed beforehand in the scanner application server 200, by using the MFP 100 to perform an arbitrary operation (for example, pressing a scanner key). At the time of activating the scanner application 210, the MFP 100 refers to the location information registered in the storage unit 140, to request the scanner application server 200 to acquire user interface (UI) information. The UI information indicates a screen to be displayed on an operation panel 110 (see FIG. 2) included in the MFP 100.

The user can set the delivery data (information indicating an output method of electronic data and information indicating a delivery destination) via the operation panel 110 of the MFP 100. After setting an arbitrary delivery destination (To, Cc, Bcc, etc. of email address) via the screen displayed on the operation panel 110, the user arranges a paper medium of the electronic data to be delivered on an auto document feeder (ADF) included in the MFP 100, thereby enabling execution of the scan. The MFP 100 also refers to the location information to transmit the scanned electronic data together with the delivery data to the delivery server 300.

The email address of the examiner is set to the MFP 100 as the delivery destination of the email. The email addresses of the approver and a distributor are set to the delivery server 300 via the MFP 100. The delivery server 300 delivers the email to the set email addresses.

Upon reception of an acquisition request of the UI information from the MFP 100, the scanner application server 200 generates the UI information and transmits the generated UI information to the MFP 100. The MFP 100 to be the destination of the UI information builds a screen corresponding to the content thereof on the operation panel 110.

The delivery server 300 delivers the electronic data received from the MFP 100 to the information processor 400. Specifically, the delivery server 300 analyzes the information indicating the output method of the electronic data received from the MFP 100 and the information indicating the delivery destination, and delivers the electronic data to the information processor 400 of the examiner, the approver, or an issuer as the delivery destination, based on the analyzed result. The delivered electronic data is received by a program installed in the information processor 400.

The delivery server 300 according to the first embodiment delivers the electronic data to the information processor 400. However, the delivery server 300 can deliver the electronic data to the information processor 400 via, for example, an external system.

The information processor 400 transfers the email between the delivery server 300 and the information processor 400.

The information processor 400 can store the electronic data as a document in a file folder delivered from the delivery server 300 and perform predetermined image processing with respect to the document. The examiner or the approver who is a receiver of the email from the delivery server 300 confirms an application content, using the information processor 400.

Figure 2:
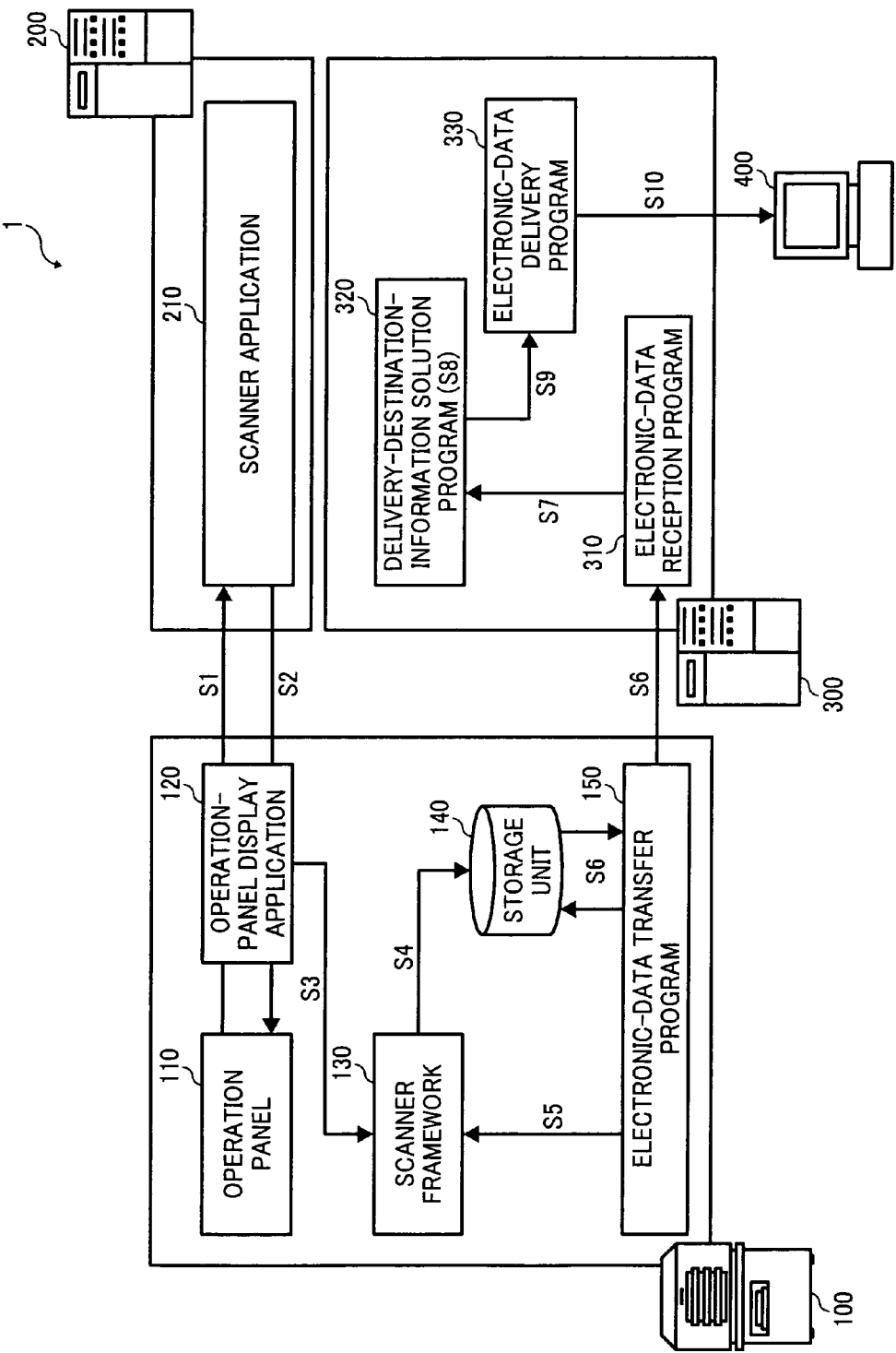
FIG. 2 is a schematic diagram of an example of a functional configuration of the delivery system.

A basic process performed by the delivery system 1 according to the first embodiment is explained next with reference to FIG. 2. FIG. 2 is a schematic diagram of an example of a functional configuration of the delivery system 1.

When the user activates the scanner application 210 via the operation panel 110, an acquisition request of the UI information to be displayed on the operation panel 110 is transmitted to the scanner application server 200 by an operation-panel display application 120 (S1).

The scanner application 210 in the scanner application server 200 generates UI information and transmits the generated UI information to the operation panel 110 with respect to the acquisition request by the operation-panel display application 120 (S2).

The operation-panel display application 120 displays a screen indicating the UI information on the operation panel 110, so that a scanning process is executed by a scanner framework 130 to read the electronic data (S3). The user can specify the delivery data (output method, delivery destination, and the like) via the operation panel 110.

The electronic data read by the scanner framework 130 is temporarily stored in the storage unit 140 in the MFP 100 (S4).

The scanner framework 130 requests an electronic-data transfer program 150 to deliver the electronic data together with the delivery data specified by the user via the operation panel 110 (S5).

The electronic data stored in the storage unit 140 is acquired by the electronic-data transfer program 150, the acquired electronic data is transmitted to the delivery server 300 together with the delivery data, and the transmitted electronic data and the delivery data are acquired by an electronic-data reception program 310 (S6).

The received delivery data is transferred to a delivery-destination-information solution program 320 by the electronic-data reception program 310 in the delivery server 300 (S7).

An output unit and a delivery address are determined by the delivery-destination-information solution program 320 based on the delivery data (S8).

The electronic data to be delivered, the information indicating the output unit of the electronic data, and the information indicating the delivery destination are transmitted to an electronic-data delivery program 330 by the delivery-destination-information solution program 320 to request execution of delivery (S9).

The electronic data is delivered to the information processor 400, which is the delivery destination, by the electronic-data delivery program 330 (S10).

Figures 3, 4, 5:
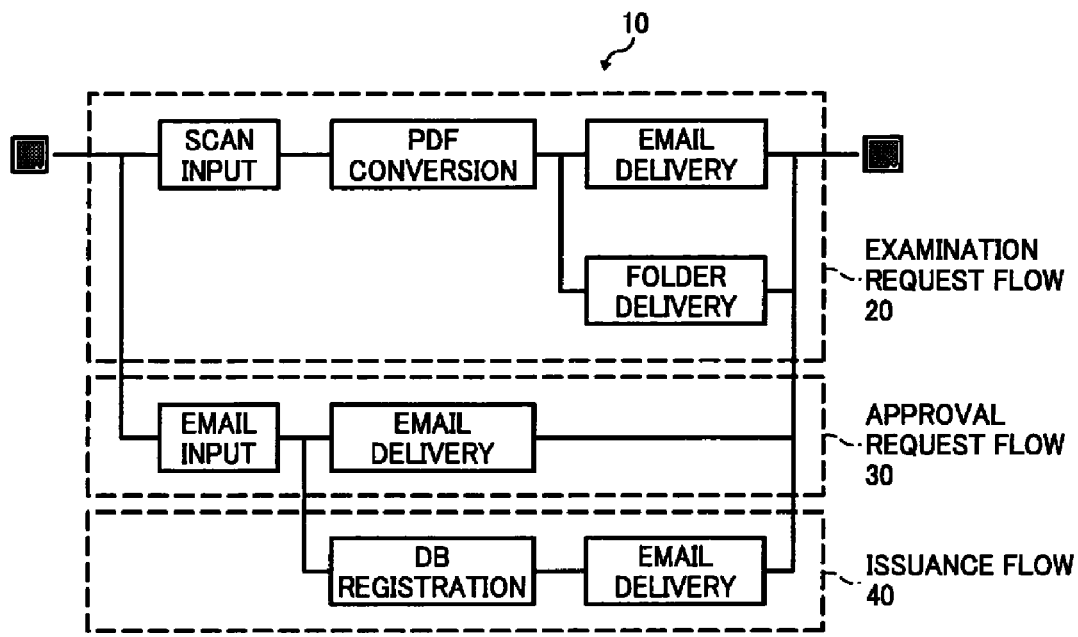
FIG. 3 is a schematic diagram of a workflow executed by the delivery system.
FIG. 4 is a schematic diagram of an example of a header of an email delivered to an information processor of an examiner by executing an examination request flow.
FIG. 5 is a schematic diagram of an example of a flow definition table.

A workflow 10 executed by the delivery system 1 according to the first embodiment is explained with reference to FIG. 3. FIG. 3 is a schematic diagram of the workflow 10 executed by the delivery system 1 according to the first embodiment.

A plurality of delivery flows is defined in the workflow 10 executed by the delivery system 1 according to the first embodiment. Specifically, as shown in FIG. 3, an examination request flow 20, an approval request flow 30, and an issuance flow 40 are defined as the delivery flow.

In the examination request flow 20, the electronic data scanned by the MFP 100 is converted to PDF, and the PDF-converted electronic data is delivered by an email. In the examination request flow 20, the email is delivered to the information processor 400 of the pre-set examiner in the email delivery connected lastly. The examiner having received the email delivered by the execution of the examination request flow 20 confirms the delivery content. When determining that there is no problem in the application content, the examiner replies to the email.

In the approval request flow 30, upon reception of the email replied from the examiner, the email is delivered. In the approval request flow 30, the email is delivered to the information processor 400 of the preset examiner. The approver having received the email delivered by the execution of the approval request flow 30 confirms the delivery content. When determining that there is no problem in the application content, the approver replies to the email.

In the issuance flow 40, upon reception of the email replied from the approver, the information indicating the approved electronic data is registered, and an approval notification is issued to the delivery destination, to which the registered electronic data is preset. The delivery destination is an applicant, the examiner, a manager of the delivery system 1, or a person associated with the delivery system 1.

A unit that executes one workflow 10 in which the delivery flows are defined is explained with reference to FIG. 4. FIG. 4 is a schematic diagram of an example of a header of the email to be delivered to the information processor 400 of the examiner by executing the examination request flow 20.

As shown in FIG. 4, "applicant" <user@xxx.co.jp> is described as the name and an email address of a sender in the header of the email to be delivered to the information processor 400 of the examiner. As shown in FIG. 4, "examiner" <sinsa@xxx.co.jp> is described as the delivery destination. As shown in FIG. 4, "delivery server email input" <email_input@xxx.co.jp> is described as a reply destination of the email by the examiner. Examination request <FlowID="0001"> is described as a subject of the email.

Because the content of the header of the email to be delivered to the information processor 400 of the approver is the same as that of the header shown in FIG. 4, explanations thereof will be omitted.

The examiner receives the email delivered from the applicant via the MFP 100 by the information processor 400 used by the examiner to confirm that there is no problem in the application content from the applicant. When determining that there is no problem in the application content, the examiner replies to the delivery server 300 in an email via the information processor 400.

"Examiner" <sinsa@xxx.co.jp> is described in the header of the email transmitted from the examiner to the delivery server 300 via the information processor 400 as the name and an email address of the sender.

FIG. 5 is a schematic diagram of an example of a flow definition table 340 stored in the delivery server 300. As shown in the drawing, the flow definition table 340 includes a From address column 342 and a FlowId column 344. The email address of the examiner or the approver is set in the From address column 342. A flow to be executed according to the email received by the delivery server 300 is set in the FlowId column 344. The delivery server 300 refers to the name and the email address of the sender described in the header of the received email to determine whether the received email is from the examiner or the approver.

For example, because "examiner" <sinsa@xxx.co.jp> is described in the header of the email from the examiner, the delivery server 300 can determine that the sender of the email is the examiner. The delivery server 300 then refers to the FlowId column 344 in the flow definition table 340, and determines the approval request flow 30 as the flow to be executed next, so that the approval request flow 30 is executed. When "approver" <shounin@xxx.co.jp> is described in the header of the received email, the delivery server 300 determines that the email is from the approver, determines the issuance flow 40 as the flow to be executed next, so that the issuance flow 40 is executed.

Thus, the flow corresponding to an input source of the received email is defined beforehand to execute the flow according to the definition, thereby enabling to execute one workflow 10 in which the delivery flows are defined.

Figure 6:
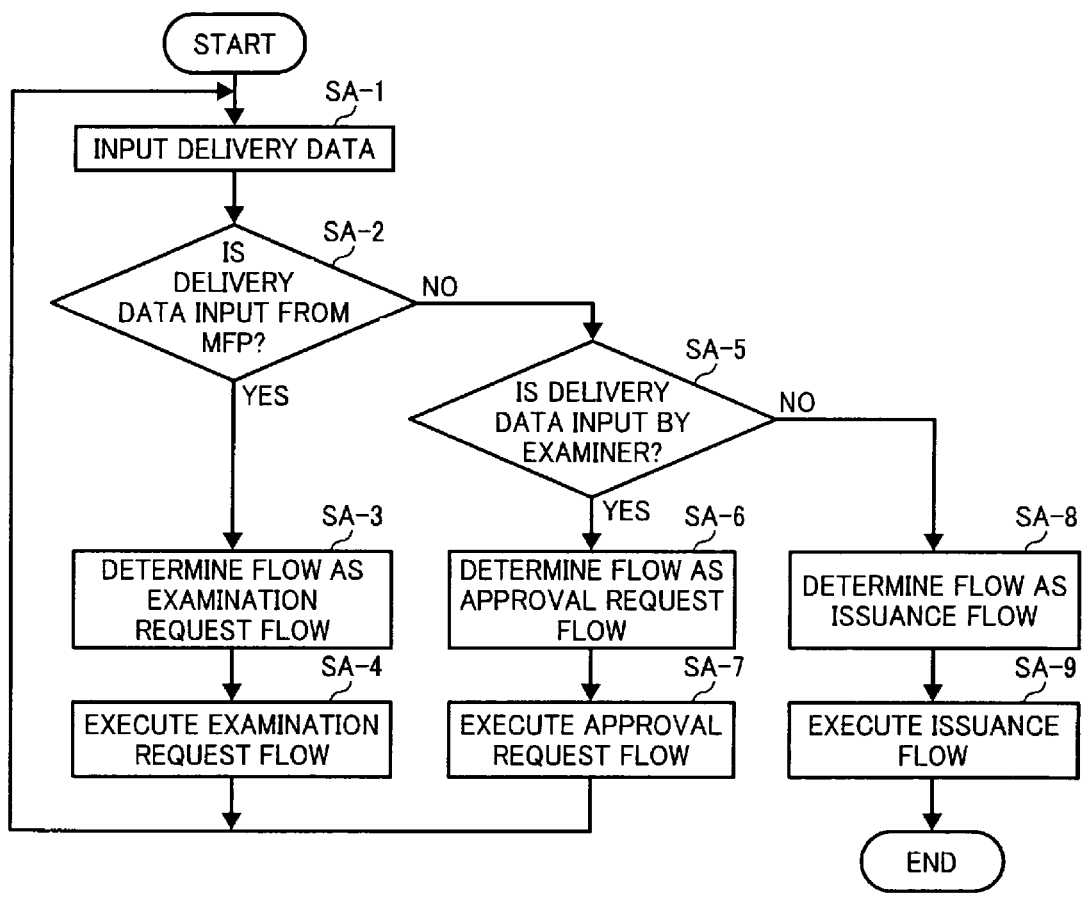
FIG. 6 is a flowchart of a process procedure for a workflow executed by the delivery system.

The process of the workflow 10 executed by the delivery system 1 according to the first embodiment is explained with reference to FIG. 6. FIG. 6 is a flowchart of a process procedure for the workflow 10 executed by the delivery system 1 according to the first embodiment.

The delivery data is input to the delivery server 300 (step SA-1). The delivery data input at step SA-1 is directly input by the applicant via the operation panel 110 of the MFP 100 or received from the information processor 400 of the examiner or the approver.

When the delivery data input at step SA-1 is directly input by the applicant to the MFP 100 (YES at step SA-2), the examination request flow 20 is determined as the flow to be executed next (step SA-3), so that the examination request flow 20 is executed (step SA-4).

When the delivery data input at step SA-1 is not directly input by the applicant to the MFP 100 (NO at step SA-2), but is transmitted from the information processor 400 of the examiner (YES at step SA-5), the approval request flow 30 is determined as the flow to be executed next (step SA-6), so that the approval request flow 30 is executed (step SA-7).

When the delivery data input at step SA-1 is not directly input by the applicant to the MFP 100 (NO at step SA-2), and is not transmitted from the information processor 400 of the examiner (NO at step SA-5), the issuance flow 40 is determined as the flow to be executed next (step SA-8), so that the issuance flow 40 is executed (step SA-9).

Accordingly, according to the delivery system 1 according to the first embodiment, the email is transmitted to the examiner via the delivery server 300. Upon reception of the email, the examiner replies to the delivery server 300. The delivery server 300 refers to the header of the email to determine the approval request flow 30 as the flow to be executed next, and transmits an email to the approver. Upon reception of the email, the approver replies to the delivery server 300. The delivery server 300 refers to the header of the email to determine the issuance flow 40 as the flow to be executed next, and transmits an email to a delivery destination. Accordingly, one workflow in which the delivery flows are defined can be executed. Specifically, when an operation is performed by transferring emails between persons in charge (applicant, examiner, and approver), one workflow in which application, examination, approval, and issuance are organized can be realized.

Figure 7:
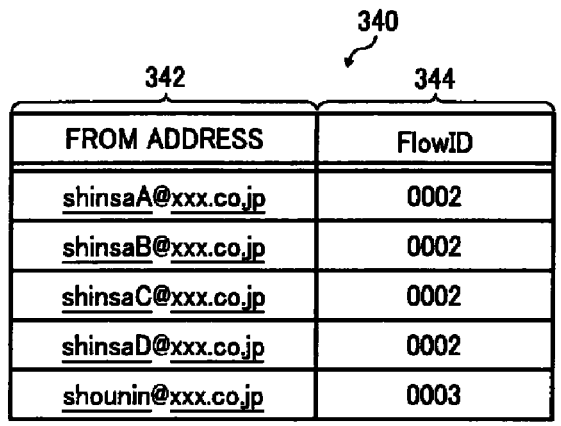
FIG. 7 is a schematic diagram of an example of the flow definition table.

The delivery server 300 according to the first embodiment can define a plurality of examiners. FIG. 7 is a schematic diagram of an example of the flow definition table 340. As shown in the drawing, in the flow definition table 340, the examiners in the From address column 342 can be recorded and set. When the examiners are set, the delivery server 300 delivers an email in which "examination request" is written as a subject sequentially to the examiners.

While one approver is recorded and set in the flow definition table 340 shown in FIG. 7, a plurality of examiners can be set.

Because the delivery server 300 sets a plurality of examiners or approvers and an email is delivered sequentially to the examiners or approvers, the number of examiners or approvers can be changed according to importance of the application content.

When an email is used for circulation, the configuration can be such that the email is not delivered sequentially to the examiners, but is simultaneously delivered to the examiners, and when there are replies by emails from all of the examiners at the delivery destinations, control shifts to the approval request flow 30. Likewise, the configuration can be such that the email is simultaneously delivered to a plurality of approvers, and when there are replies by emails from all of the approvers, control shifts to the issuance flow 40.

Figure 8A:
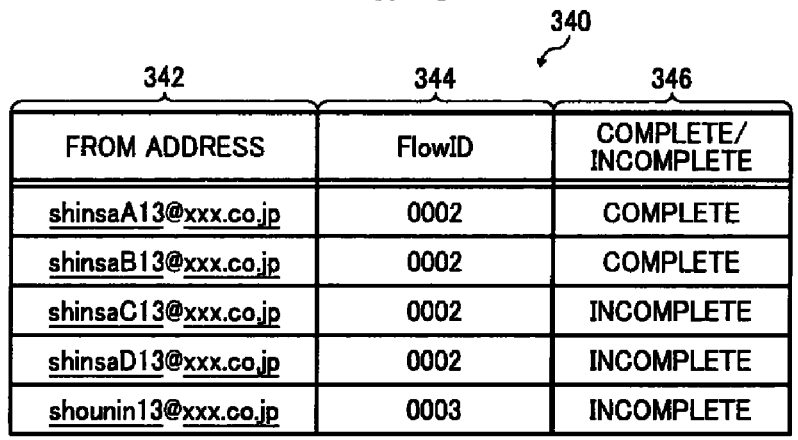
FIG. 8A is a schematic diagram of another example of the flow definition table.
Figure 8B:
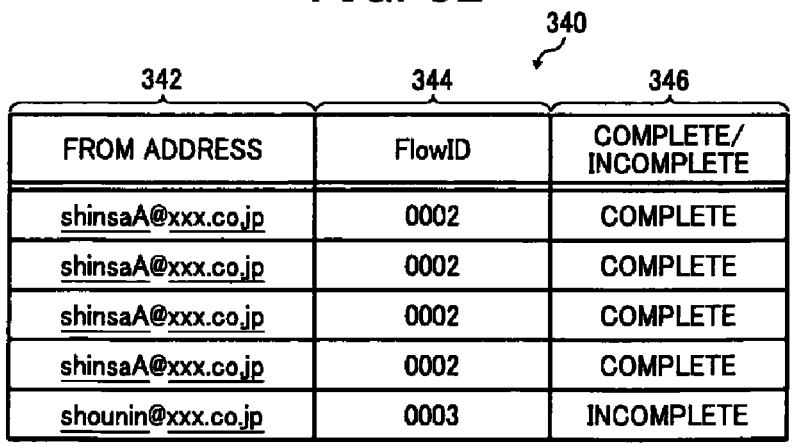
FIG. 8B is a schematic diagram of still another example of the flow definition table.

FIGS. 8A and 8B are schematic diagrams of examples of the flow definition table 340 when the emails are simultaneously delivered to a plurality of examiners. A complete/incomplete column 346 indicates presence of reply from the examiner or the approver. When there is a reply from the examiner or the approver, a character "complete" is input to the complete/incomplete column 346 corresponding to the replied examiner or approver. FIG. 8A indicates that a reply from sinsaA@xxx.co.jp and sinsaB@xxx.co.jp is already complete, respectively. When there is a reply from sinsaC@xxx.co.jp and sinsaD@xxx.co.jp, respectively, and when the complete/incomplete column 346 corresponding to the email addresses of the examiners in the From address column 342 is completely filled with the character "complete" as shown in FIG. 8B, an email is delivered to the email address of the approver set in the From address column 342 and the approval request flow 30 is executed.

When an email is simultaneously delivered to a plurality of examiners for circulation, and there are replies by emails from all of the examiners or approvers at the delivery destinations, control can shift to the approval request flow 30 or to the issuance flow 40. Accordingly, the delivery system 1 that requires agreement of all of the examiners can be realized.

A delivery system according to a second embodiment of the present invention is explained below. In the first embodiment, the examiner or the approver having received the email from the delivery server 300 confirms the application content via the information processor 400.

On the other hand, in the second embodiment, the examiner or the approver having received the email from the delivery server 300 confirms the application content via the operation panel 110 of the MFP 100.

A conformation method of the application content by the examiner or the approver, which is a characteristic part of the second embodiment, is explained with reference to FIGS. 9A to 9E. The confirmation method of the application content by the examiner is explained below, and because the confirmation method of the application content by the approver is the same as that by the examiner, explanations thereof will be omitted.

The MFP 100 according to the second embodiment notifies an examination number required when the examiner performs examination via the operation panel 110 of the MFP 100, via the delivery server 300. Therefore, the MFP 100 manages the application content to be examined for each examiner in association with the information indicating whether the examination content is confirmed by the examiner.

Figure 9A:
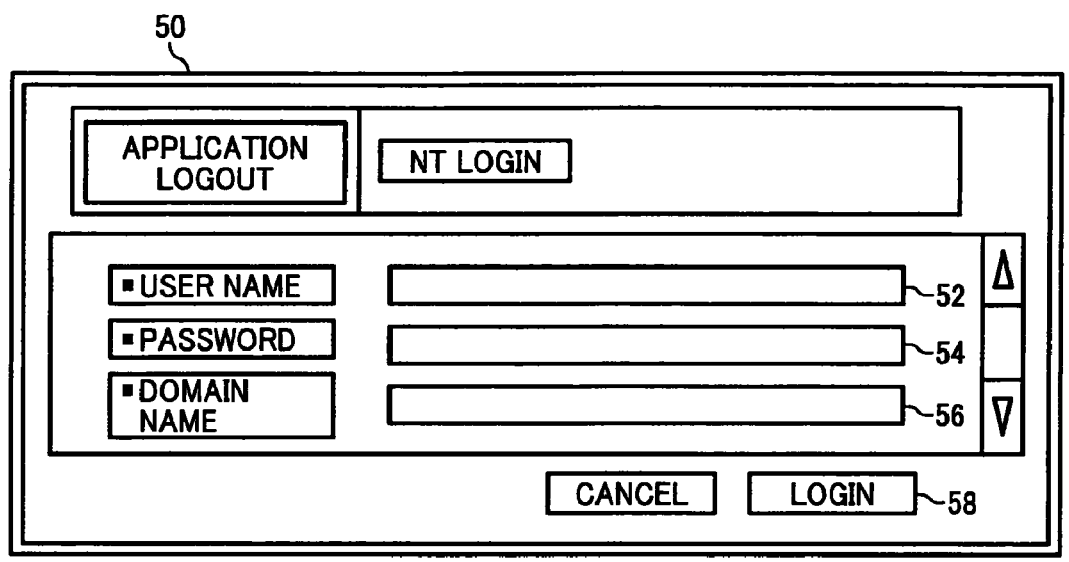
FIG. 9A is a schematic diagram of an example of a login screen.

FIG. 9A is a schematic diagram of an example of a login screen 50 displayed on the operation panel 110 of the MFP 100. The examiner inputs predetermined items respectively in a user name field 52, a password field 54, and a domain name field 56.

Figure 9B:
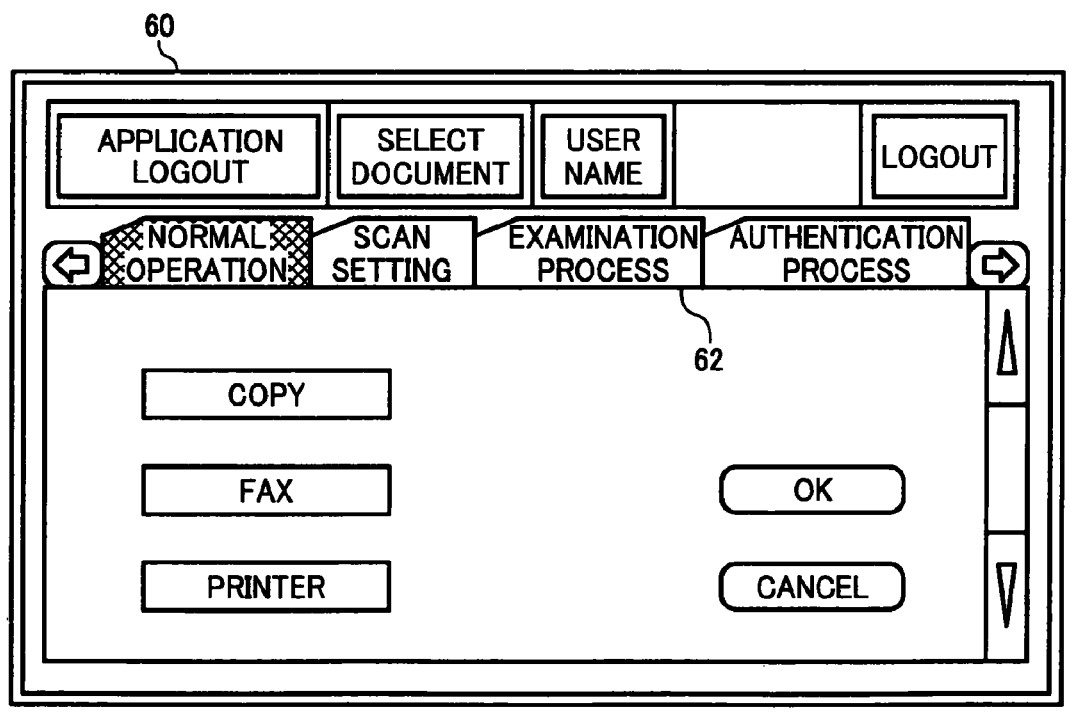
FIG. 9B is a schematic diagram of an example of a normal operation screen.

When the examiner presses a login button 58 on the login screen 50, as shown in FIG. 9B, the MFP 100 displays a normal operation screen 60 on the operation panel 110.

Figure 9C:
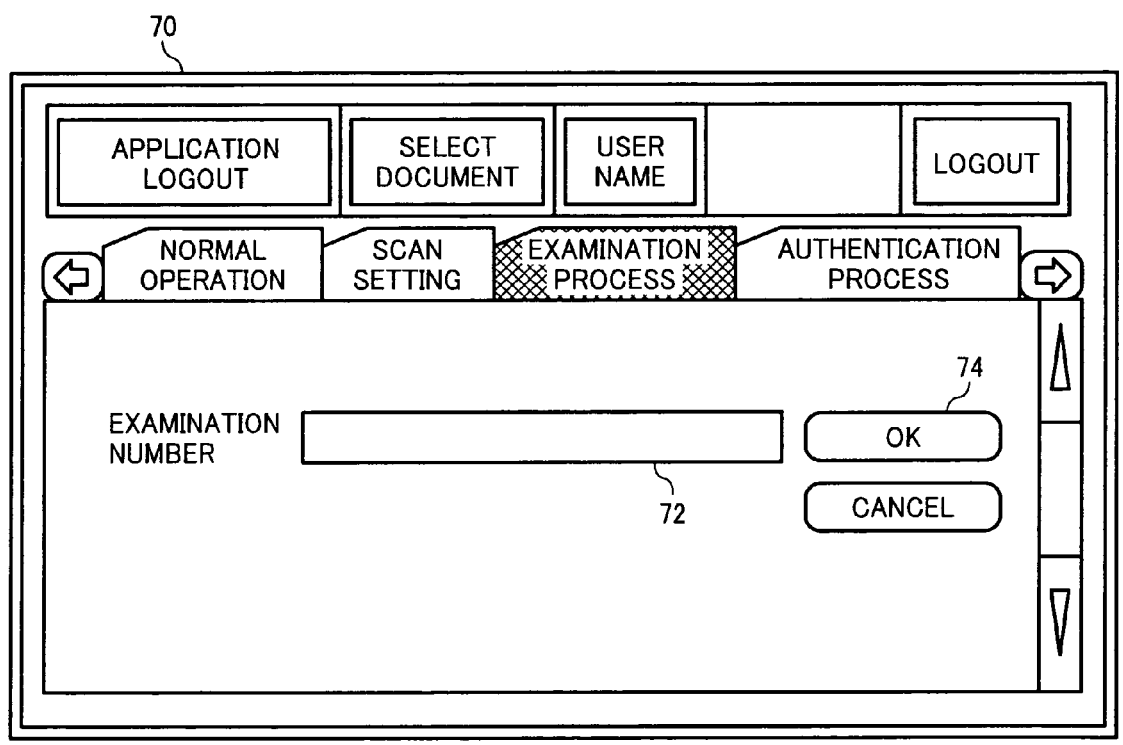
FIG. 9C is a schematic diagram of an example of an examination-number input screen.

When the examiner presses an examination process button 62 on the normal operation screen 60, as shown in FIG. 9C, the MFP 100 displays an examination-number input screen 70 on the operation panel 110.

Figure 9D:
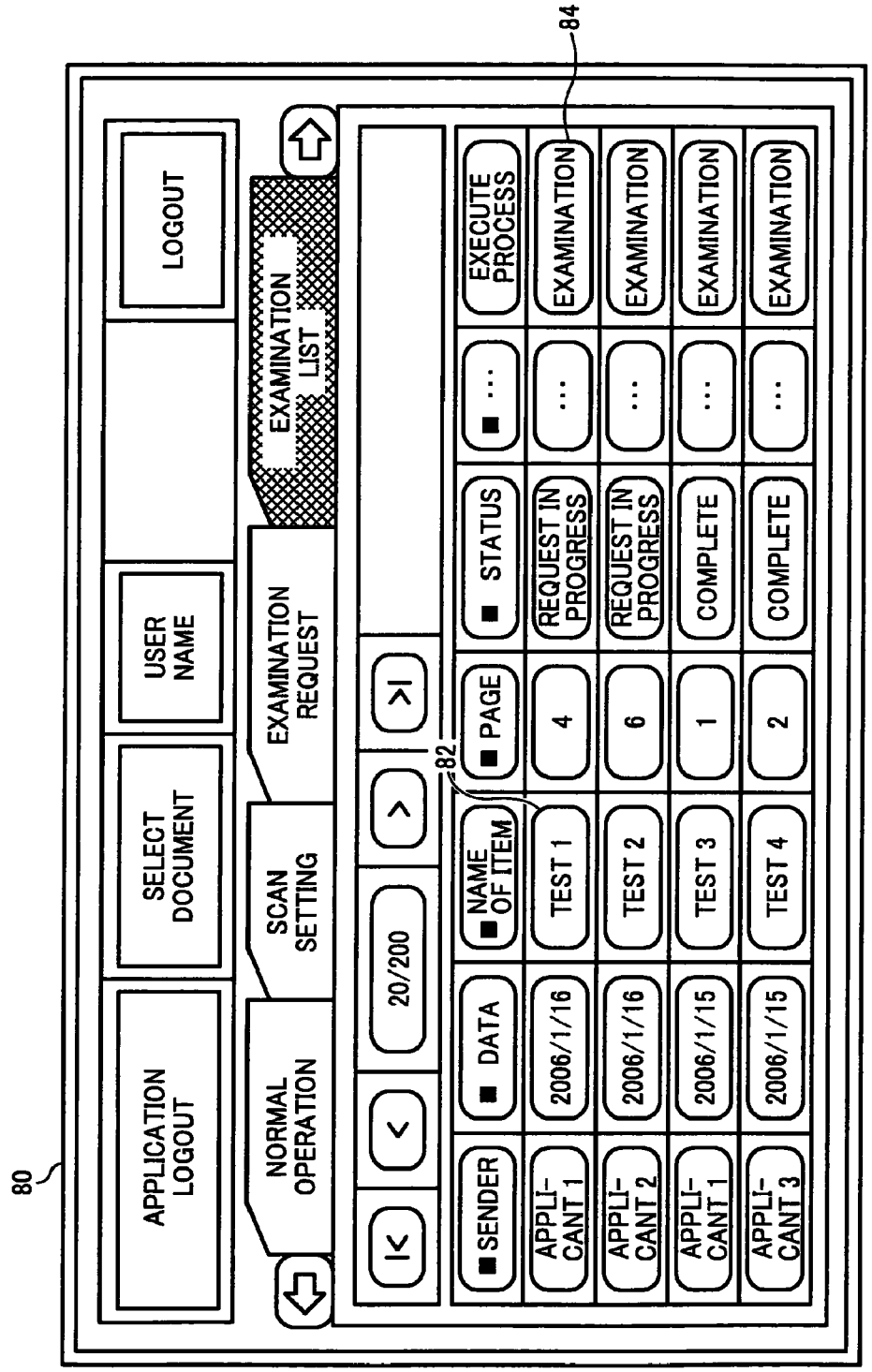
FIG. 9D is a schematic diagram of an example of an examination list screen.

When the examiner inputs an examination number notified from the delivery server 300 in an examination-number input field 72 on the examination-number input screen 70 and presses an OK button 74, as shown in FIG. 9D, the MFP 100 displays an examination list screen 80 indicating the information of the application content on the operation panel 110.

When the examiner presses, for example, a Test1 button 82 on the examination list screen 80, the MFP 100 displays a screen (not shown), on which the document of Test 1 to be examined can be viewed on the operation panel 110.

The examiner can print the document (Test1) displayed on a browsing screen on the operation panel 110. The MFP 100 can print the document having an embedded pattern. The MFP 100 can also transmit the document displayed on the browsing screen on the operation panel 110 to an address specified by the email. The examiner can also select whether the output format of the document displayed on the browsing screen is to be printed out or to be transmitted by the email.

When the examination button 84 on the examination list screen 80 is pressed by the examiner, the delivery system 1 shifts from the examination request flow 20 to the approval request flow 30. That is, the MFP 100 delivers the email to the information processor 400 of the approver via the delivery server 300.

Figure 9E:
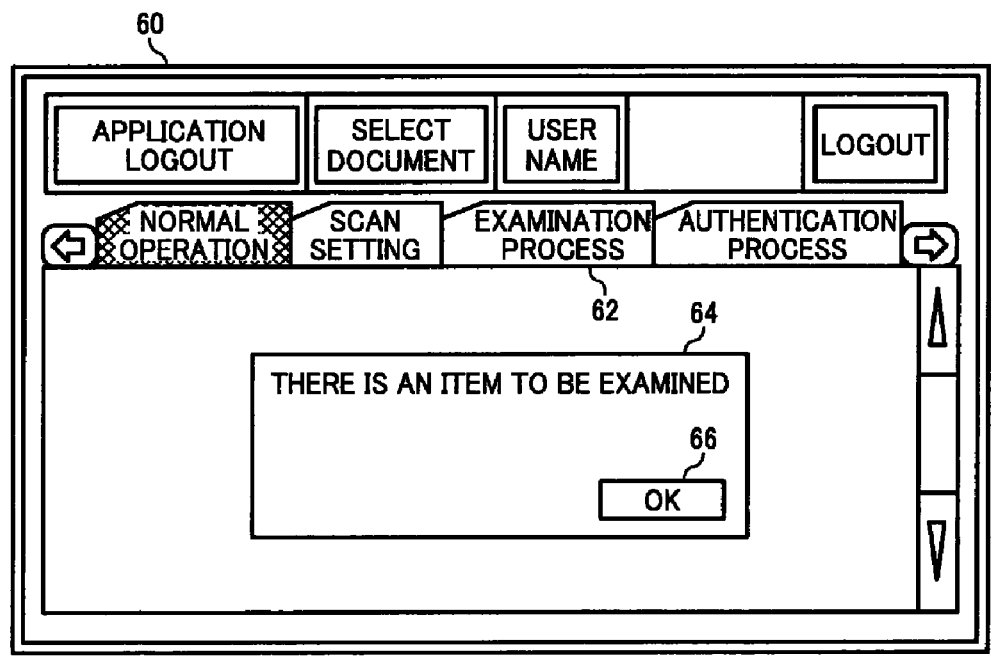
FIG. 9E is a schematic diagram of an example of a pop-up dialog.

When finishing the login process via the login screen 50 (see FIG. 9A), the MFP 100 according to the second embodiment displays the normal operation screen 60 (see FIG. 9B) and displays the examination-number input screen 70 (see FIG. 9C) when the examination process button 62 is pressed. However, for example, when finishing the login process, the MFP 100 can display a pop-up dialog 64 for notifying that there is an item to be examined, as shown in FIG. 9E, together with the normal operation screen 60. In such a configuration, when an OK button 66 in the pop-up dialog 64 and the examination process button 62 are continuously pressed by the examiner, the MFP 100 displays the examination list screen 80 (see FIG. 9D).

Accordingly, in the delivery system 1 according to the second embodiment, the MFP 100 manages the application content to be examined for each examiner in association with the information indicating whether the examination content is confirmed by the examiner, and transmits an email including the examination number to the examiner. When the examiner having received the email inputs the received examination number via the operation panel 110 of the MFP 100, the examination list screen 80 is displayed. Accordingly, the examiner can perform the examination process via the operation panel 110 of the MFP 100.

In the delivery system 1 according to the second embodiment, when the login process via the login screen 50 is completed, the pop-up dialog 64 is displayed simultaneously with the normal operation screen 60. Accordingly, the examiner can easily ascertain whether there is an item to be examined.

A delivery system 1 according to a third embodiment of the present invention is explained next. In the first embodiment, the electronic data scanned by the MFP 100 is delivered to the information processor 400 of the examiner or the approver via the delivery server 300.

On the contrary, in the third embodiment, the electronic data scanned by the MFP 100 is uploaded together with a form for confirming the application content, and information indicating a link destination of the uploaded form is delivered to the information processor of the examiner or the approver by an email.

A conformation method of the application content by the examiner or the approver, which is the characteristic part of the third embodiment, is explained below with reference to FIGS. 10 and 11. The confirmation method of the application content by the examiner is explained below, and because the confirmation method of the application content by the approver is the same as that by the examiner, explanations thereof will be omitted.

FIG. 10 is a schematic diagram of an example of the examination request flow 20 in the third embodiment. In the examination request flow 20 in the third embodiment, as shown in FIG. 10, the electronic data scanned by the MFP 100 is converted to PDF, the PDF-converted electronic data is delivered to a Web server (not shown) together with the form for confirming the application content, and an email including the information indicating the link destination of the electronic data delivered to the Web server is delivered to the information processor 400 of the examiner.

FIG. 11 is a schematic diagram of an example of the email delivered from the MFP 100 to the examiner by executing the examination request flow 20 in the third embodiment. As shown in the drawing, the MFP 100 delivers an email including information indicating the link destination of the uploaded form to the information processor 400 of the examiner.

The examiner having received the email shown in FIG. 11 can confirm the application content based on the form of the link destination. Accordingly, because the subject included in the header of the email received from the MFP 100 cannot be corrected, execution of the approval request flow 30 due to an unauthorized operation can be prevented beforehand.

In the delivery system 1 according to the third embodiment, the MFP 100 uploads the scanned electronic data together with the form for confirming the application content, and delivers the email including the information indicating the link destination of the uploaded form to the information processor 400 of the examiner or the approver. The examiner or the approver then confirms the delivery content based on the form of the link destination via the information processor 400. Accordingly, execution of the approval request flow 30 due to an unauthorized operation can be prevented beforehand.

The object of the present invention can be also achieved by providing a recording medium, on which a program code of software that realizes the function of the delivery server 300 is recorded, to a system or a device and executing the program code stored on the recording medium by a computer (or CPU, MPU, or DSP) of the system or the device.

In this case, the program code itself read from the recording medium realizes the function of the delivery server 300, and therefore the recording medium storing the program code or a program thereof constitutes the present invention. An optical recording medium, a magnetic recording medium, a magneto-optic recording medium, and a semiconductor recording medium, such as a flexible disk (FD), a hard disk (HD), an optical disk, a magneto-optical disk, a compact disk-read only memory (CD-ROM), a CD-recordable (CD-R), a magnetic tape, a nonvolatile memory, and a read only memory (ROM), can be used as the recording medium for distributing the program code.

It is a matter of course that not only the function of the delivery server 300 is realized by executing the program code read by the computer, but also an operating system (OS) operating on the computer can perform a part of or the entire actual process based on an instruction in the program code, to realize the function of the image processor by the process.

Further, after the program code read from the recording medium is written in a memory included in a function enhancement board inserted into the computer or a function enhancement unit connected to the computer, a CPU included in the function enhancement board or the function enhancement unit can also perform a part of or the entire actual process based on the instruction in the program code, to realize the function of the delivery server by the process.

As described above, according to an aspect of the present invention, when transfer of an electronic mail or an electronic document is performed between persons in charge (applicant, examiner, and approver) to perform an operation, a workflow in which application, examination, and approval are organized can be realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A delivery system including a delivery server that is hardware and executes a predetermined workflow for executing a series of processes from a reception to a delivery of electronic data on a network in a predetermined sequence by receiving the electronic data from an image forming apparatus and delivering the electronic data to an information processing apparatus at a delivery destination, wherein
the workflow defines, using flow definition data stored in the delivery server, a plurality of delivery flows for delivering the electronic data to a plurality of information processing apparatuses at different delivery destinations, respectively;
the flow definition data includes pieces of data origination information indicating a source of data, and pieces of flow-identification-information, each of which identifies one of the delivery flows and is associated with data origination information;
the delivery server, when receiving electronic data that includes delivery-destination-information input at one of the information processing apparatuses, performs a first delivery flow that delivers the electronic data to another of the information processing apparatuses according to the delivery-destination-information input at the one information processing apparatus;
the delivery server, when receiving the electronic data from one of the information processing apparatuses with a piece of data origination information, performs at least a second delivery flow that delivers the electronic data to another of the information processing apparatuses according to the delivery flow specified by a corresponding piece of the flow-identification-information associated with the one piece of the data origination information; and
wherein the delivery server performs the first delivery and the second delivery sequentially,
wherein the delivery flows include at least an examination request flow in which an electronic mail is delivered to an information processing apparatus of an examiner for requesting an examination of the electronic data, an approval request flow in which an electronic mail is delivered to an information processing apparatus of an approver for requesting an approval of the electronic data, and an issuance flow in which a notification informing that the electronic data has been approved is issued to an information processing apparatus of a user involved in a delivery, and wherein the delivery server delivers the electronic mail to a plurality of information processing apparatuses of examiners in the examination request flow, and executes the approval request flow after taking the examination by the examiners that are delivery destinations of the electronic mail delivered in the examination request flow.

2. The delivery system according to claim 1, wherein the delivery server registers address information of the information processor of the examiner or the information processing apparatus of the approver, determines the delivery flow to be executed from among the delivery flows based on address information included in a header of the electronic mail from either one of the information processing apparatus of the examiner and the information processing apparatus of the approver.

3. The delivery system according to claim 1, wherein the image forming apparatus executes either one of the examination in the examination request flow and the approval in the approval request flow.

4. The delivery system according to claim 3, wherein the image forming apparatus receives a login input for executing either one of the examination in the examination request flow and the approval in the approval request flow, and upon receiving the login input, displays a screen for informing that there is an item to be examined or approved.

5. The delivery system according to claim 4, wherein the image forming apparatus manages the item to be examined or approved for each examiner or approver.

6. The delivery system according to claim 4, wherein the image forming apparatus prints the screen on a paper medium or transmits the screen to a specified email address.

7. The delivery system according to claim 1, wherein the delivery server uploads the electronic data to be delivered to the information processing apparatus of the examiner together with an examination form in the examination request flow, and delivers uploaded address information on a network to the information processing apparatus of the examiner.

8. A computer program product comprising a non-transitory computer-usable medium having computer-readable program codes embodied in the medium that when executed cause a computer to execute a delivery program for executing a function of a delivery server in a delivery system, wherein the delivery server executes a predetermined workflow for executing a series of processes from a reception to a delivery of electronic data on a network in a predetermined sequence by receiving the electronic data from an image forming apparatus and delivering the electronic data to an information processing apparatus at a delivery destination, and the workflow, using a flow definition data stored in the delivery server, defines a plurality of delivery flows for delivering the electronic data to a plurality of information processing apparatuses at different delivery destinations, respectively;

the flow definition data includes pieces of data origination information indicating a source of data, and pieces of flow-identification-information, each of which identifies one of the delivery flows and is associated with data origination information;

the delivery server, when receiving electronic data that includes delivery-destination-information input at one of the information processing apparatuses, performs a first delivery flow that delivers the electronic data to another of the information processing apparatuses according to the delivery-destination-information input at the one information processing apparatus;

the delivery server, when receiving the electronic data from one of the information processing apparatuses with a piece of data origination information, performs at least a second delivery flow that delivers the electronic data to another of the information processing apparatuses according to the delivery flow specified by a corresponding piece of the flow-identification-information associated with the one piece of the data origination information; and wherein the delivery server performs the first delivery and the second delivery sequentially, wherein the delivery flows include at least an examination request flow in which an electronic mail is delivered to an information processing apparatus of an examiner for requesting an examination of the electronic data, an approval request flow in which an electronic mail is delivered to an information processing apparatus of an approver for requesting an approval of the electronic data, and an issuance flow in which a notification informing that the electronic data has been approved is issued to an information processing apparatus of a user involved in a delivery, and wherein the delivery server delivers the electronic mail to a plurality of information processing apparatuses of examiners in the examination request flow, and executes the approval request flow after taking the examination by the examiners that are delivery destinations of the electronic mail delivered in the examination request flow.

9. The delivery system according to claim 1, wherein an electronic mail is delivered to the information processing apparatuses together with the electronic data in each of the delivery flows; and the input from the person in charge is transmitted as an electronic mail replied to the electronic mail delivered together with the electronic data in previous one of the delivery flows.

10. The delivery system according to claim 1, wherein the input from the person in charge is input via the image forming apparatus.

11. The delivery system according to claim 1, wherein the input from the person in charge is input using a form uploaded to a Web server.

12. The delivery system according to claim 1, wherein the delivery server, when receiving the electronic data from one of the information processing apparatuses with a second piece of data origination information that is different from the first piece of data origination information, performs at least a third delivery flow that delivers the electronic data to another of the information processing apparatuses according to the delivery flow specified by a corresponding piece of the flow-identification-information associated with the second piece of the data origination information.

13. The delivery system according to claim 12, wherein the first delivery flow, the second delivery flow, and the third delivery flow are performed sequentially.

14. A delivery system including a delivery server that is hardware and executes a predetermined workflow for executing a series of processes from a reception to a delivery of electronic data on a network in a predetermined sequence, wherein the workflow defines, using a flow definition table stored in the delivery server, a plurality of delivery flows for delivering the electronic data to a plurality of information processing apparatuses at different delivery destinations, respectively;

the flow definition table includes pieces of origination address information indicating a source of data received at the delivery server, and pieces of flow-identification-information, each piece of flow-identification-information identifying one of the delivery flows and being associated with at least one of the pieces of origination address information; and the delivery server, when receiving electronic data with a piece of origination address information from one of the information processing apparatuses, performs a first delivery flow that delivers the electronic data to another of the information processing apparatuses according to the delivery flow specified by a corresponding piece of the flow-identification-information associated with the piece of origination address information, the delivery server, when receiving the electronic data with a piece of origination address information from one of the information processing apparatuses, performs at least a second delivery flow that delivers the electronic data to another of the information processing apparatuses according to the delivery flow specified by a corresponding piece of the flow-identification-information associated with the one piece of the origination address information; and wherein the delivery server performs the first delivery and the second delivery sequentially, wherein the delivery flows include at least an examination request flow in which an electronic mail is delivered to an information processing apparatus of an examiner for requesting an examination of the electronic data, an approval request flow in which an electronic mail is delivered to an information processing apparatus of an approver for requesting an approval of the electronic data, and an issuance flow in which a notification informing that the electronic data has been approved is issued to an information processing apparatus of a user involved in a delivery, and wherein the delivery server delivers the electronic mail to a plurality of information processing apparatuses of examiners in the examination request flow, and executes the approval request flow after taking the examination by the examiners that are delivery destinations of the electronic mail delivered in the examination request flow.

15. The delivery system according to claim 14, wherein the origination address information is an electronic mail address, and the piece of origination address information received from one of the information processing apparatuses is in an electronic mail header.

\* \* \* \* \*